United States Patent
Chou et al.

(10) Patent No.: US 6,618,333 B1
(45) Date of Patent: Sep. 9, 2003

(54) REFERENCE CLOCK GENERATING CIRCUIT OF DISK DATA BURST CUTTING AREA

(75) Inventors: Sue-Hong Chou, Taipei (TW); Yi-Lin Lai, Keelung (TW)

(73) Assignee: Via Technologies, Inc. (TW)

( * ) Notice: Subject to any disclaimer, the term of this patent is extended or adjusted under 35 U.S.C. 154(b) by 0 days.

(21) Appl. No.: 09/717,580

(22) Filed: Nov. 21, 2000

(30) Foreign Application Priority Data

Dec. 7, 1999 (TW) .................................... 88220801 U

(51) Int. Cl.[7] .................................................. G11B 5/09
(52) U.S. Cl. .................................. 369/47.36; 369/47.41
(58) Field of Search ............................. 369/47.26, 47.27, 369/47.28, 47.37, 47.41, 47.46, 47.47, 47.48, 53.3, 59.23, 59.2, 47.36, 47.38, 47.45, 47.43; 360/71, 72.2, 73.03, 51, 52

(56) References Cited

U.S. PATENT DOCUMENTS

| | | | | |
|---|---|---|---|---|
| 5,089,757 A | * | 2/1992 | Wilson | 360/77.02 |
| 5,315,571 A | * | 5/1994 | Maeda et al. | 369/47.41 |
| 5,377,178 A | * | 12/1994 | Saito et al. | 369/124.07 |
| 6,538,965 B2 | * | 3/2003 | Mochizuki et al. | 369/47.22 |

* cited by examiner

*Primary Examiner*—Thang V. Tran

(57) ABSTRACT

A reference clock generating circuit of a disk data burst cutting area is disclosed. Thereby, the BCA reference clock is generated by dividing the reference clock of a spindle control circuit for further capturing the BCA clock and the BCA data so that the BCA data and BCA clock are stably generated even if the rotary speed of the motor is changed.

7 Claims, 4 Drawing Sheets

REFERENCE CLOCK GENERATING CIRCUIT OF DISK DATA BURST CUTTING AREA

FIELD OF THE INVENTION

The present invention relates to a reference clock generating circuit for a burst cutting area (BCA), and especially to for a reference clock generating circuit, by which a reference clock of a spindle control circuit can be divided to acquire a BCA reference clock.

BACKGROUND OF THE INVENTION

Since the photoelectric technology is improved greatly, a high quality image and audio effect can be acquired through a digital video and audio technology. The digital versatile disk is widely used recently. In the manufacturing of the digital versatile disk, a burst cutting area (BCA) is formed near the center round hole of the disk, referring to FIG. 1. In FIG. 1, a center hole is formed in the center of a disk 1. The periphery of the center hole 2 is with a burst cutting area (BCA) 3 for recording special information of the disk. Referring to FIG. 2, the special information in the burst cutting area of the disk illustrated in FIG. 1 is illustrated. (If low level is defined as 1 bit, then a period T can be used to store a plurality of 0 bits, while the 0 bit represent different section 1, 3, 5 etc., stores with different contents).

However, currently, the system clock in the controlling chip set is applied as a BCA reference clock for reading BCA data. With reference to FIG. 3, a BCA reference clock (BCAREFCLK) of the current system clock is illustrated, which is employed to acquire the BCA data. FIG. 3 illustrates a control chip of a DVD-ROM drive. The system clock generator 6 receivers an output frequency from an oscillator 5. Afterwards, the system clock generator 6 outputs a BCA reference clock (BCAREFCLK).

However, in this conventional method, user must refer the rotary speed of the spindle motor, and monitors the system clock correspondent to the rotary speed of the motor for processing the BCA data. Namely, the user must perform the transformation operation of current rotary speed and BCA channel bit cycle for reading the BCA data. When the rotary speed of the spindle motor increases, the system clock also increases, therefore, a big trouble is induced as the user programs a BCA reference clock register.

SUMMARY OF THE INVENTION

Accordingly, the primary object of the present invention is to provide a BCA reference clock generating circuit of a DVD drive from the reference clock of a spindle control circuit. Besides, a BCA clock and BCA data is generated from the BCA reference clock. Therefore, through a varied reference clock, the BCA data of a digital video disk is read stably without considering the rotary speed of the spindle motor.

Therefore, the reference clock outputted from the spindle control circuit can be varied with the rotary speed of the spindle motor, (and the channel bit of the BCA is a fixed reference clock cycle), so that the user is unnecessary to perform the transformation operation between the current rotary speed and the BCA channel bit cycle.

To achieve the above objects, the present invention a reference clock generating circuit for a disk data burst cutting area (BCA) comprising a reference clock being an original reference clock employed in a spindle control circuit; a plurality of dividers being connected in series for receiving signals of the reference clock; after the reference clock is divided in different dividers, a BCA reference clock being generated; a spindle control circuit structure to a last output of the plurality of dividers for generating signals for being inputted to a motor, thereby, the motor rotating in a forward or a backward direction or stopping; and a Hall sensor for receiving a Hall sensor impulse signal; after the impulse is processed by the Hall sensor, a disk rotary frequency (FODR) being generated; and then the frequency being transferred to the spindle control circuit.

The reference clock signal is outputted from one of the plurality of dividers as a reference clock of a BCA data in a digital video disk (DVD). As a result, in a read mode, the BCA is unnecessary to refer to rotary speed of the spindle motor, and thus it is a clock signal varied with variation of the rotary speed.

Preferably, the BCA reference clock from the reference clock is divided by the dividers is further processed by a BCA data slicer for generating a BCA data and then is transferred to a BCA clock extractor for reading the BCA data in a digital video disk.

Moreover, the serial connected dividers include a first divider, a second divider and a third divider, which are connected in series.

The various objects and advantages of the present invention will be more readily understood from the following detailed description when read in conjunction with the appended drawing.

DETAILED DESCRIPTION OF THE PREFERRED EMBODIMENTS

The present invention primarily relates to a BCA reference clock generating circuit in a DVD drive. In the present invention, the BCA reference clock (BCAREF CLK) is generated by dividing a reference clock of a spindle control circuit.

Figure 1:
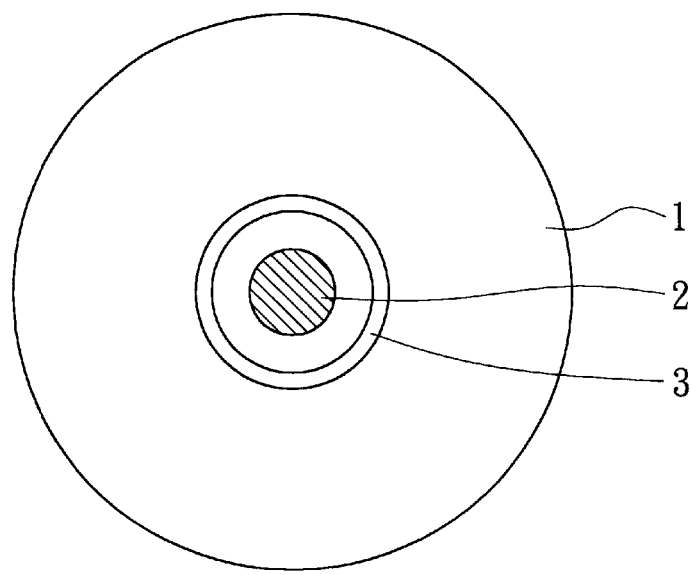
FIG. 1 is a front view of a prior art digital video disk, wherein a position of the burst cutting area (BCA) is illustrated.
Figure 2:
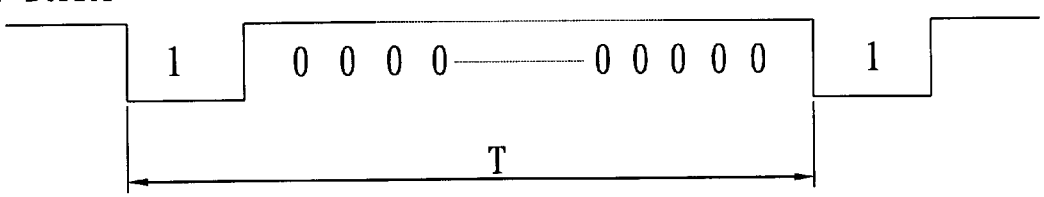
FIG. 2 illustrates the BCA of a digital video disk.
Figure 3:
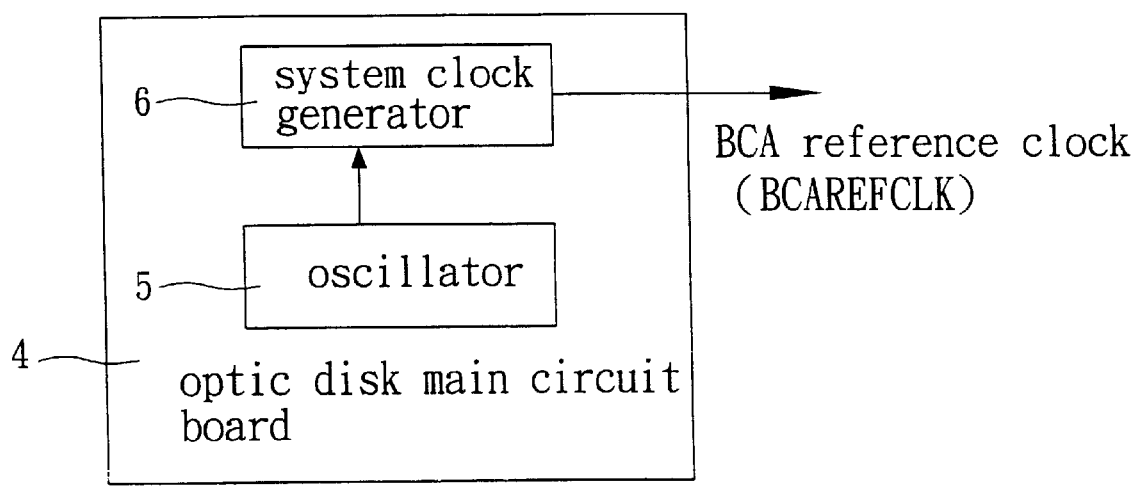
FIG. 3 is a circuit block diagram of a prior control chip in a optical disk drive.
Figure 4:
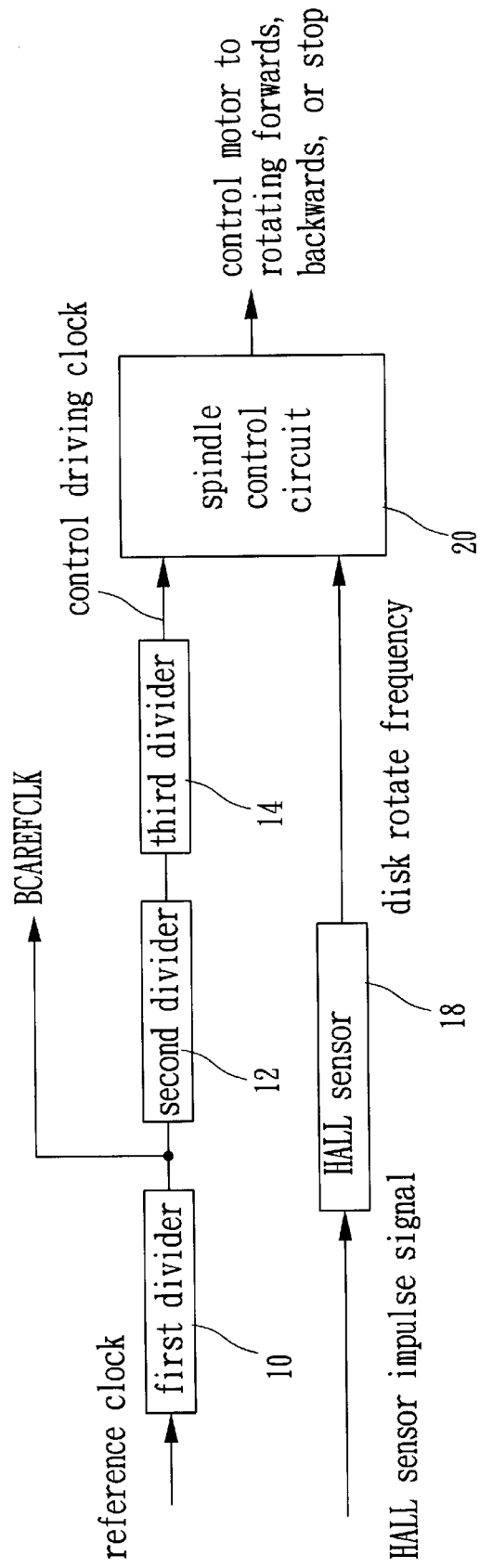
FIG. 4 shows a block diagram of the BCA reference clock generator in the embodiment of the present invention.

The embodiment of the present invention, which applies a spindle control circuit, may refer to FIG. 4. In FIG. 4, a spindle control circuit 20 serves to generate a signal for driving the motor to rotate forwards, backwards, or stop. The front-end input signal thereof is a reference clock (REFCLK), which is an original reference clock, used in the spindle control circuit 20. Then reference clock is processed through a plurality of dividers 10, 12 and 14, and finally, a signal for controlling the rotation of the motor is generated. The plurality of dividers is connected in series for dividing the reference clock. Referring to FIG. 4, a first divider 10 is connected to a second divider 12, and then is further connected to a third divider 14. After dividing in different stages, a control driving reference clock is generated and transferred to the spindle control circuit 20. During the process, the BCA reference clock is generated, i.e., the output clock from the first divider 10 is applied as the BCA reference clock (BCAREFCLK).

Besides, FIG. 4 also shows a Hall sensor 18 for receiving a Hall sensor impulse signal. The Hall sensor 18 processes the signal, and then a frequency of disk rotation (FODR) is generated, and then FODR is transferred to the spindle control circuit 20. Therefore, since the aforesaid reference clock signal is outputted through one of the plurality of dividers, the reference clock signal is used as BCA data reference clock of a digital video disk (DVD) drive so that in the read mode, the variation rotary speed of the spindle motor is not concerned by firmware. Therefore, the BCAREFCLK is varied with the variation of the rotary speed.

For the embodiment of the present invention illustrated in FIG. 4, a practical experiment has been realized. At first, for the three dividers, the first divider 10 is a div/4 divider (divided by 4); the second divider is an div/1116 (divided by 1116), and the third divider 14 is a div/336 dividers (divided by 336). In the embodiment, a reference clock (REFCLK) has a frequency of 39.24 MHz. After divided by the three dividers 10, 12 and 14, a signal of 24 Hz (39.24 MHz/4/1116/336=24 Hz) is acquired and then the resulting signal is transferred to the spindle control circuit 20 for controlling the motor. When the spindle control circuit 20 of the motor is steady, the rotary frequency of the disk is 24 Hz. When the spindle motor is steady, the rotary speed of the spindle is retained in a 1440 rpm, and the time period of the BCA channel bit is 8.89 us.

In the aforesaid embodiment, if the reference clock has a frequency of 39.24 MHz, then the BCA reference clock (BCAREFCLK) outputted from the first divider 10 has a frequency of 39.24M/4=9.81 MHz, Therefore, as the speed of the BCA channel bit is increased, the signal of the BCA reference clock will speed up. The numeral relation of the two is not affected by the rotary speed of the motor.

For example, when the rotary speed of the motor has an increment of 30%, then reference clock (REFCLK) will become 1.3 times. In the meantime, after dividing, the BCA reference clock (BCAREFCLK) has an increment of 30%. Therefore, the relation between the BCA reference clock (BCAREFCLK) and the BCA channel bit will not be affected by variation of the rotary speed of the spindle. When the rotary speed of the motor changes, other than the REFCLK changes so that the BCAREFCLK is also changed. Under the condition that the REFCLK is unchanged, the first divider is also changed. Namely, for example, when the rotary speed of the motor is increased with a value of 30%, the operation of the first divider will change to be 4/1.3=2.5 from the original dividing by 4. When the first divider is changed as divided by 2.5, the BCAREFCLK is also changed as 1.3 times of the original value.

Figure 5:
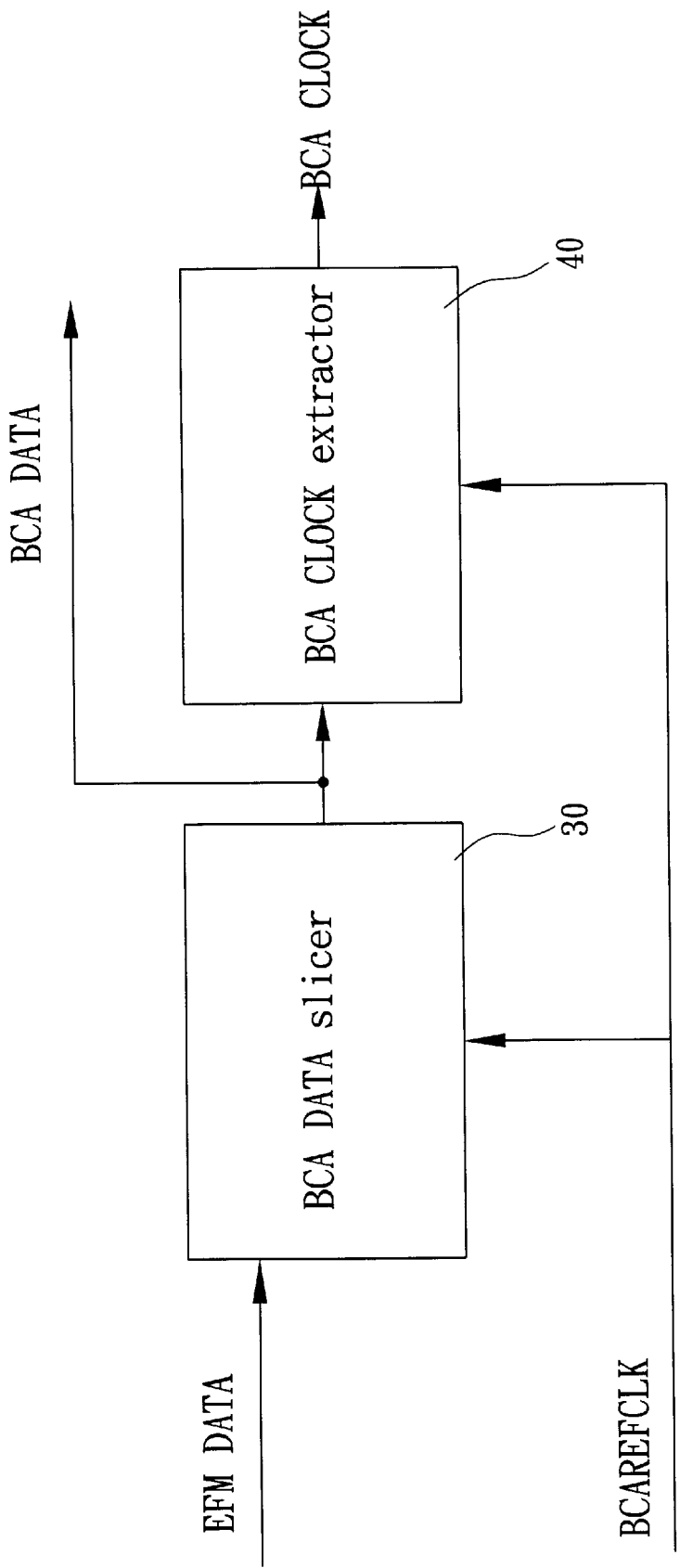
FIG. 5 is a circuit block diagram for generating BCA data and BCA clock signal from the BCA reference clock in the invention.

The following description states how to generate BCA data and BCA clock by the BCAREFCLK. FIG. 5 is a circuit block diagram illustrating that the in the embodiment of the present invention, (a BCA reference clock (BCAREFCLK) and an original optic disk digital data signal (EFM data).

A BCA data and a BCA clock are outputted according to BCAREFCLK and EFM data.

In FIG. 5, a BCA data slicer 30 receives the BCA reference clock (BCAREFCLK) and the original optic disk digital data signal (EFM data). The EFM data is an original signal module in the eight to fourteen modulations in the original optic disk. Besides, the BCA data slicer 30 is similar to a data slicer. With the BCA reference clock (BCAREFCLK) and the EFM data, a BCA data is generated.

That is in the BCA data slicer 30, the EFM data is converted into a BCA data, and the BCA reference clock (BCAREFCLK) serves to count the EFM data and detects the lower reflectance stripes. Furthermore, the EFM data is correspondent to the BCA reference clock (BCAREFCLK). The signal frequency of EFM data is also related to the rotary speed of a motor. Namely, when the rotary speed of a motor is changed, the signal frequency changed Next, the BCA data is processed through a BCA clock extractor 40, and in the meanwhile, with the BCA reference clock (BCAREFCLK), a BCA clock is generated. Similarly, the BCA reference clock (BCAREFCLK) is employed to count the BCA data channel bit. Therefore, the BCA data channel bit is correspondent to the BCA reference clock (BCAREFCLK). As a result, the BCA clock and the BCA data can be stably captured, and not affected by the rotation speed of the motor.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A burst cutting area (BCA) reference clock generating circuit in an optical storage device having a spindle, for receiving a reference clock (REFCLK) to generate a BCA reference clock (BCAREFCLK), comprising:

a first divider, generating the BCAREFCLK according to the REFCLK;

a spindle control circuit, coupled to the first divider, for controlling a rotating speed of the spindle;

wherein said BCAREFCLK signal is in response to the rotating speed of the spindle.

2. The burst cutting area (BCA) reference clock generating circuit as claimed in claim 1, further comprising a BCA data slicer and a BCA clock extractor, wherein said BCA reference clock is further processed by the BCA data slicer for generating a BCA data and the BCA data is coupled to the BCA clock extractor for generating a BCA clock.

3. The burst cutting area (BCA) reference clock generating circuit as claimed in claim 1, wherein the frequency of said REFCLK is varied with variation of said spindle.

4. The burst cutting area (BCA) reference clock generating circuit as claimed in claim 1, wherein the driving of said divider is changed with variation of said spindle.

5. A burst cutting area (BCA) reference clock generating circuit in an optical storage device, having a spindle for receiving a reference clock (REFCLK) to generate a BCA reference clock (BCAREFCLK), comprising:

a first divider, generating the BCAREFCLK according to the REFCLK being connected in series for receiving signals;

a spindle control circuit, coupled to the first divider, for controlling a rotating speed of the spindle;

a BCA data slicer for receiving said BCA reference clock and a data signal to generate a BCA data; and a BCA clock extractor for receiving the BCA data outputted from said BCA data slicer and said BCA reference clock for generating a BCA clock;

wherein said BCAREFCLK signal is in response to the rotating speed of the spindle.

6. The burst cutting area (BCA) reference clock generating circuit as claimed in claim 5, wherein the frequency of said REFCLK is varied with variation of said spindle.

7. The burst cutting area (BCA) reference clock generating circuit as claimed in claim 5, wherein the driving of said divider is changed with variation of said spindle.

* * * * *